United States Patent
Minder

(10) Patent No.: US 6,553,380 B2
(45) Date of Patent: Apr. 22, 2003

(54) ENCAPSULATING FORM AND FUNCTION IN USER DATA IN A RELATIONAL DATABASE IN ORDER TO ELIMINATE DATABASE SCHEMA CHANGES

(75) Inventor: Sharon E. Minder, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 09/738,379

(22) Filed: Dec. 15, 2000

(65) Prior Publication Data

US 2002/0078063 A1 Jun. 20, 2002

(51) Int. Cl.[7] .............................................. G06F 17/30
(52) U.S. Cl. ...................... 707/100; 707/505; 707/506; 707/507; 707/508
(58) Field of Search ................................ 707/100, 505, 707/506, 507, 508

(56) References Cited

U.S. PATENT DOCUMENTS 5,168,565 A * 12/1992 Morita ........................... 707/3
5,797,137 A * 8/1998 Golshani et al. ............... 707/4
6,446,256 B1 * 9/2002 Hyman et al. ............... 717/143

* cited by examiner

Primary Examiner—Safet Metjahic
Assistant Examiner—Cam Linh Nguyen
(74) Attorney, Agent, or Firm—Jon A. Gibbons; Fleit, Kain, Gibbons, Gutman & Bongini P.L.

(57) ABSTRACT

A method for encapsulating the form and function of user data in a relational database that eliminates database schema changes whenever the presentation of the user data changes is described. The method comprises receiving source data, associated source data definitions and report layouts consisting of report headings and report logic. The source data definitions and the report layouts are parsed into three or more user data types: (1) an organizational type fields identifying a data collection; (2) value type fields containing data values in the data collection; and (3) procedural type fields containing one or more form keywords and function keywords. After the source data is received and parsed, the method includes the steps of: creating one or more form keywords for classifying and describing the data values that can be collected and presented based upon the source data definitions and the report headings; creating one or more function keywords for identifying an arithmetic relationship for the data values in the data collection based upon the report logic; creating blank or NotApplicable form and function keywords to indicate when a form or function keyword in the procedural type field does not apply for some user data. Next, the form keywords and the function keywords are associated with the source data based upon a conversion mapping table that specifies which of the form keywords and which of the function keywords are assigned to the source data definitions so as to create user data.

7 Claims, 13 Drawing Sheets

CALL STATISTIC RECORD CONVERSION TO ENCAPSULATED CALL STATISTIC RECORDS

CALL STATISTIC RECORD (SOURCE DATA) 302

| COMP ID | UNIT ID | OPER ID | DATE | SESS ID | TIME ID | CALL COUNT | CALL DURATION | REQUEST COUNT | REQUEST DURATION | SEARCH COUNT | SEARCH DURATION |
|---|---|---|---|---|---|---|---|---|---|---|---|
| 1 | 1 | 1 | 12/31/00 | 1 | 10:00 | 10 | 220 | 15 | 200 | 25 | 100 |
| FIELD #1 | #2 | #3 | #4 | #5 | #6 | #7 | #8 | #9 | #10 | #11 | FIELD #12 |

FIG. 9A

CONVERSION MAPPING TABLE 704

TABLE FIELD ENTRY # OR SOURCE FIELD #

| OUTPUT RECORD | ClassID ENTRY # | GaugeID ENTRY # | AveraageID ENTRY # | SOURCE FIELD # | SOURCE FIELD # |
|---|---|---|---|---|---|
| #1 | 1 | 1 | 1 | 7 | (7/7) |
| #2 | 1 | 2 | 2 | 8 | 7 |
| #3 | 2 | 1 | 2 | 9 | 7 |
| #4 | 2 | 2 | 3 | 10 | 9 |
| #5 | 3 | 1 | 3 | 11 | 9 |
| #6 | 3 | 2 | 4 | 12 | 11 |

(RESULT OF 1 REPRESENTS A SINGLE TimeID)

OUTPUT USER DATA RECORD FIELD #

| FIELD #7 | FIELD #8 | FIELD #9 | FIELD #10 | FIELD #11 |

PROCEDURAL TYPE FIELD TABLES 706

CLASS TABLE (CONTAINS FORM KEYWORDS)
ENTRY
1 CALL
2 REQUEST
3 SEARCH
802 — ClassID

GAUGE TABLE (CONTAINS FORM KEYWORDS)
ENTRY
1 COUNT
2 DURATION
804 — GaugeID

AVERAGE TABLE (CONTAINS FORM KEYWORDS)
ENTRY
1 PER_TIME
2 PER_CALL
3 PER_REQUEST
4 PER_SEARCH
806 — AverageID

FIG. 9B

ECAPSULATED CALL STATISTIC RECORD (USER DATA) AFTER CONVERSION ROUTINE 708

| COMP ID | UNIT ID | OPER ID | DATE | SESS ID | TIME ID | CLASS ID | GAUGE ID | AVERAGE ID | TOTAL | QUANTI-FIER | |
|---|---|---|---|---|---|---|---|---|---|---|---|
| 1 | 1 | 1 | 12/31/00 | 1 | 10:00 | CALL | COUNT | PER_TIME | 10 | 1 | 812 |
| 1 | 1 | 1 | 12/31/00 | 1 | 10:00 | CALL | DURATION | PER_CALL | 220 | 10 | 814 |
| 1 | 1 | 1 | 12/31/00 | 1 | 10:00 | REQUEST | COUNT | PER_CALL | 15 | 10 | 815 |
| 1 | 1 | 1 | 12/31/00 | 1 | 10:00 | REQUEST | COUNT | PER_REQUEST | 200 | 15 | 818 |
| 1 | 1 | 1 | 12/31/00 | 1 | 10:00 | SEARCH | COUNT | PER_REQUEST | 25 | 15 | 820 |
| 1 | 1 | 1 | 12/31/00 | 1 | 10:00 | SEARCH | DURATION | PER_SEARCH | 100 | 25 | 822 |

FIELD #1　#2　#3　#4　#5　#6　#7　#8　#9　FIELD #10　#11

FIG. 10 1000

AVERAGES ARE PRESENTED IN THE FOLLOWING REPORT AFTER THE OUTPUT 710
USER DATA IS IMPORTED INTO A RELATIONAL DATABASE TABLE OPERSTAT_ENCAP
SQL QUERY:
SELECT CLASSID, GAUGEID, AVERAGEID, TOTAL, QUANTIFIER, TOTAL/QUANTIFIER
AS AVERAGE FROM OPERSTAT_ENCAP

| CLASS ID | GAUGE ID | AVERAGE ID | TOTAL | QUANTI-FIER | AVERAGE |
|---|---|---|---|---|---|
| CALL | COUNT | PER_TIME | 10 | 1 | 10 |
| CALL | DURATION | PER_CALL | 220 | 10 | 22 |
| REQUEST | COUNT | PER_CALL | 15 | 10 | 1.5 |
| REQUEST | DURATION | PER_REQUEST | 200 | 15 | 13.4 |
| SEARCH | COUNT | PER_REQUEST | 25 | 15 | 1.7 |
| SEARCH | DURATION | PER_SEARCH | 100 | 25 | 4 |

FIG. 11 1100

MODIFIED CALL STATISTIC RECORD (SOURCE DATA) 1202

| COMP ID | UNIT ID | OPER ID | DATE | SESS ID | TIME ID | CALL COUNT | CALL DURATION | REQ. COUNT | REQ. DURATION | SEARCH COUNT | SEARCH DURATION | SEARCH KEYSTROKES |
|---|---|---|---|---|---|---|---|---|---|---|---|---|
| 1 | 1 | 1 | 12/31/00 | 1 | 10:00 | 10 | 220 | 15 | 200 | 25 | 100 | 250 |
| FIELD #1 | FIELD #2 | FIELD #3 | FIELD #4 | FIELD #5 | FIELD #6 | FIELD #7 | FIELD #8 | FIELD #9 | FIELD #10 | FIELD #11 | FIELD #12 | FIELD #13 |

CONVERSION MAPPING TABLE 704

TABLE FIELD ENTRY # OR SOURCE FIELD #

| OUTPUT RECORD | ClassID ENTRY # | GaugeID ENTRY # | AveraageID ENTRY # | SOURCE FIELD # | SOURCE FIELD # | |
|---|---|---|---|---|---|---|
| #1 | 1 | 1 | 1 | 7 | (7/7) | (RESULT OF 1 REPRESENTS A SINGLE TimeID) |
| #2 | 1 | 2 | 2 | 8 | 7 | |
| #3 | 2 | 1 | 2 | 9 | 7 | |
| #4 | 2 | 2 | 3 | 10 | 9 | |
| #5 | 3 | 1 | 3 | 11 | 9 | |
| #6 | 3 | 2 | 4 | 12 | 11 | |
| #7 | 3 | 3 | 4 | 13 | 11 | |

OUTPUT USER DATA RECORD FIELD #

FIELD #7   FIELD #8   FIELD #9   FIELD #10   FIELD #11   *906*

PROCEDURAL TYPE FIELD TABLES 706

| | CLASS TABLE (CONTAINS FORM KEYWORDS) | | GAUGE TABLE (CONTAINS FORM KEYWORDS) | | AVERAGE TABLE (CONTAINS FORM KEYWORDS) |
|---|---|---|---|---|---|
| ENTRY #1 #2 #3 | CALL REQUEST SEARCH | ENTRY #1 #2 #3 | COUNT DURATION KEYSTROKES | ENTRY #1 #2 #3 #4 | PER_TIME PER_CALL PER_REQUEST PER_SEARCH |
| 802 | ClassID | 804 | GaugeID | 806 | AverageID |

ENCAPSULATED CALL STATISTIC RECORDS (USER DATA) AFTER CONVERSION ROUTINE 708

| COMP ID | UNIT ID | OPER ID | DATE | SESS ID | TIME ID | CLASS ID | GAUGE ID | AVERAGE ID | TOTAL | QUANTI-FIER | |
|---|---|---|---|---|---|---|---|---|---|---|---|
| 1 | 1 | 1 | 12/31/00 | 1 | 10:00 | CALL | COUNT | PER_TIME | 10 | 1 | 812 |
| 1 | 1 | 1 | 12/31/00 | 1 | 10:00 | CALL | DURATION | PER_CALL | 220 | 10 | 814 |
| 1 | 1 | 1 | 12/31/00 | 1 | 10:00 | REQUEST | COUNT | PER_CALL | 15 | 10 | 815 |
| 1 | 1 | 1 | 12/31/00 | 1 | 10:00 | REQUEST | DURATION | PER_REQUEST | 200 | 15 | 818 |
| 1 | 1 | 1 | 12/31/00 | 1 | 10:00 | SEARCH | COUNT | PER_REQUEST | 25 | 15 | 820 |
| 1 | 1 | 1 | 12/31/00 | 1 | 10:00 | SEARCH | DURATION | PER_SEARCH | 100 | 25 | 822 |
| 1 | 1 | 1 | 12/31/00 | 1 | 10:00 | SEARCH | KEYSTROKES | PER_SEARCH | 250 | 25 | 1302 |

FIELD #1  #2  #3  #4  #5  #6  #7  #8  #9  #10  #11

AVERAGES ARE PRESENTED IN THE FOLLOWING REPORT AFTER THE OUTPUT USER DATA IS IMPORTED INTO A RELATIONAL DATABASE TABLE OPERSTAT_ENCAP
-NO CHANGES NEED TO BE MADE TO THE RELATIONAL DATABASE USER DATA SCHEMA
-NO CHANGES NEED TO BE MADE TO THE SQL QUERY TO DISPLAY THE NEW DATA FROM THE MODIFIED SOURCE RECORD
-THE NEW DATA IS PRESENTED IN THE OUTPUT OF THE SQL QUERY AS AN ADDITIONAL ROW
SQL QUERY:
SELECT CLASSID, GAUGEID, AVERAGEID, TOTAL, QUANTIFIER, TOTAL/QUANTIFIER AS AVERAGE FROM OPERSTAT_ENCAP

| CLASS ID | GAUGE ID | AVERAGE ID | TOTAL | QUANTI-FIER | AVERAGE |
|---|---|---|---|---|---|
| CALL | COUNT | PER_TIME | 10 | 1 | 10 |
| CALL | DURATION | PER_CALL | 220 | 10 | 22 |
| REQUEST | COUNT | PER_CALL | 15 | 10 | 1.5 |
| REQUEST | DURATION | PER_REQUEST | 200 | 15 | 13.4 |
| SEARCH | COUNT | PER_REQUEST | 25 | 15 | 1.7 |
| SEARCH | DURATION | PER_SEARCH | 100 | 25 | 4 |
| SEARCH | KEYSTROKES | PER_SEARCH | 250 | 25 | 10 |

FIG. 14 1400

ENCAPSULATING FORM AND FUNCTION IN USER DATA IN A RELATIONAL DATABASE IN ORDER TO ELIMINATE DATABASE SCHEMA CHANGES

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

The invention relates to improvements in data definitions as applied to relational databases. More particularly, the invention relates to encapsulation methods of user data to eliminate database schema changes whenever the presentation of the user data changes.

2. The Prior Art

FIG. 1 illustrates a functional block diagram of a typical prior art telephone network for bulk calling using analog phone lines to a Public Switch Telephone Network (PSTN). Several Customer Telephones 102, are coupled to the PSTN 104. A plurality of Operator Stations 110 with a Server Database 108 connected to a Network 106 is shown. Results from customer directory assistance inquires which are retrieved from the Server Database 108 are displayed on the appropriate Operator Station 110. At each Operator Station 110, an Operator Telephone 112 is connected to the PSTN 104. The connection between the Operator Telephone 112 to the PSTN 104 is over analog lines 114. An Operator sitting at an Operator Station 110 uses the Operator Telephone 112 connected to the PSTN 104, to perform directory information search requests on the Server Database 108. In some embodiments, the number in the database is automatically dialed from the Server Database 108 for the Operator sitting at the Operator Station 110. The Operator Stations 110 comprise a workstation, a dumb terminal or a generic information processing unit running Windows, DOS, Linux, Macintosh or equivalent. The Server Database 108 comprise any of a number of machines similar to those mentioned for the Operator Station 110 but that responds to data queries from the Operator Station 110. On a periodic timetable, directory assistance utilization information from the Operator Stations 110 is gathered into a Relational Database 116. For the purposes of the disclosure, both the Operator Station 110, the Server Database 108, and the Relational Database 116 are to be known as "information processing units". The Operator Station 110 comprising the aforementioned information processing units are used for a variety of purposes. These include database information storage, web based audio visual communication, system control, directory assistance utilization information storage and other generic processing functions. Relational Database 116 is used to report information about directory assistance utilization. This information is variable and subject to change. Requirements for the information to be collected and how it is reported vary by customer. A problem with the prior art is that it is difficult and expensive to change and to customize the information being collected and the reports that present the information.

FIG. 2 is a block diagram 200 of call interaction between a Caller 202 using Customer Telephone 102 and an Operator 204 using the Operator Station 110 and PSTN of FIG. 1. A call is an interaction between a Caller 202 and a directory assistance Operator 204. During the call, the Caller 202 can request one or more telephone number listings. Typically, the Operator 204 may perform one or more searches of Listing Database Tables 206 in Server Database 108 for each request. The call is terminated when the caller hangs up or is transferred to another operator.

FIG. 3 is a block diagram 300 of prior art call statistics generation after each operator call using the PSTN of FIG. 1. Call Statistics are generated after each call has terminated in FIG. 2 and are stored in a temporary repository on the Operator Station 110. When a data collection Instance occurs, the interim Call Statistics are gathered and summarized into a Call Statistic Record 302 which is comprised of Organizational Type Fields 308 and Call Data Type Fields 310, then sent to a Central Data Collector 304 which processes the data collections into a Relational Database Table 306 in Relational Database 116 so that they can be archived, analyzed, and displayed.

The Organizational Type Fields 308 in the Call Statistic Record 302 are generally composed of two subtypes: 1) Business Organizational Type Fields 400; and 2) Time Organizational Data Type Fields 414. FIG. 4A is a block diagram 400 illustrating an exemplary prior art hierarchy of Business Organizational Type Fields of the directory assistance call statistics generated in FIG. 3. In this example the Operator 402 is part of a physical or geographic entity or Unit 404, say Miami and the Unit 404 is part of a Complex 404 such as a regional telephone company, such as Bell Atlantic.

A prior art time hierarchy of Time Organizational Type Fields 414 for directory assistance call statistics generated in FIG. 3 are shown in FIG. 4B. Data Collection Instance 408, Session-Shift 410 and Year-Month-Day 412 fields are illustrated.

The Call Data Type Fields 310 in the Call Statistic Record 302 are generally composed of two subtypes: 1) Call Data Numeric Information Type Fields 500; and 2) Call Data Activities Type Fields 512. FIG. 5A is a block diagram illustrating exemplary prior art Call Data Numeric Information Type Fields of the directory assistance call statistics generated in FIG. 3. Call Data Numeric Information Type Fields 500 for a directory assistance application represent numeric information such as Count 502 and Duration 504.

The FIG. 5B is a block diagram illustrating exemplary prior art hierarchy of Call Data Activities Type Fields 512. Activities shown are Search 506 within Request 508 within Call 510.

FIG. 6 shows a prior art Call Statistic Record 302 generated during a data collection instance for an Operator Station 110. The Business Organization Type Fields 400 of the Complex 406, the Unit 404 and the Operator 402 are shown as inputs to the Organizational Type Fields 308. The Time Organizational Type Fields 414 of the Year-Month-Day 412, the Session-Shift 410, and the Data Collection Instance 408 are shown as inputs to the Organizational Type Fields 308. The Call Data Activities Type Fields 512 of the Call 510, the Request 508, and the Search 506 are combined with The Call Data Numeric Information Type Fields 500 of the Count 502 and the Duration 504 as inputs to the Call Data Type Fields 310 for Call Statistic Record 302.

The user interface at the Operator Station 110 is very flexible and customizable. The requirements for the directory assistance utilization information to be collected vary by customer and can change as the interface at the Operator Station 110 is modified. At each instance of data collection, the directory assistance utilization information reflects activities that were performed in that timeframe and thus are a subset of all possible activities.

The implementation of the directory assistance utilization information data collection has many shortcomings. The format of the directory assistance utilization information collected by the Operator Station 110 is a single fixed length record containing a series of text and numeric quantities. What these quantities represent cannot be determined by inspecting the record itself. The record format is also designed to contain values for all possible information that can be collected. Frequently each record generated at a data collection instance will contain zeros where the information did not exist. At each data collection instance, each quantity is stored into a predetermined position in the record by software on the Operator Station 110. Each time new information needs to be collected, both the software on the Operator Station 110 and the record format must be changed to add the new data.

The implementation of the Relational Database 116 for directory assistance utilization information is similar to the implementation of the directory assistance utilization information data collection on the Operator Workstation 110. The Central Data Collector 304 contains software that extracts each quantity from each predetermined position in the record and stores that quantity in a predetermined field name in the Relational Database 116 schema. Each time the record format is changed on the Operator Station 110, the software on the Central Data Collector 304 must change to accept the new format and extract the new data. The schema of the Relational Database 116 also needs to have new fields added into tables.

The presentation of the directory assistance utilization information stored in the Relational Database 116 in runtime SQL queries and stored reports suffers from additional flaws. The data stored in the schema represents raw information. Additional knowledge is required if a user wishes to do further processing of the information in runtime SQL queries. Data can easily be misrepresented. The stored reports are complex. Raw information is retrieved from the database and then manipulated in compiled program logic that differs for each report. Each time the schema of the Relational Database 116 needs to be modified to add new fields, extensive modifications to numerous stored reports by a programmer with knowledge of the new data being collected is required. In order to validate that the modifications to the stored reports are correct, a comprehensive set of test cases must be developed and then executed in a functioning test environment. This can require a significant amount of test equipment and resources.

In order to rollout changes to the record format, Relational Database 116 schema, and stored reports, a costly and time consuming migration process is required. This process is difficult to implement on a running customer system without sacrificing data integrity. During the migration, the customer system must be able to keep processing calls. The Operator Stations 110 must be migrated in phases, since a shutdown and restart is required to start using the new software. Since for a period of time, both the old and the new record formats will be used, the Relational Database 116 must be migrated to the new schema and stored reports first. It will need to be shutdown during the migration in order to save the old data, convert to the new schema, then convert the old data and store it into the new tables. While the Relational Database 116 is not operational, the Central Data Collector 304 must temporarily gather the data that is still arriving in the old format. When the Relational Database 116 migration is complete, before it can be restarted, the Central Data Collector 304 must be shutdown so that its software can be modified to accept both types of record formats. All data received in the old format needs to be converted to the new format with zeros to reflect new data that was missing in the old format. The data stored temporarily when the Relational Database 116 was shutdown must also be converted to the new format. The Central Data Collector 304 can then be restarted, and then the Relational Database 116 can be restarted. The potential for data loss exists while the Central Data Collector 304 is shutdown during its migration.

After all the Operator Stations 110 are migrated, the software on the Central Data Collector 304 can be modified to accept the new format only. Again the Central Data Collector 304 will require a shutdown and restart with the potential for data loss during that time. Data loss occurs if the Operator Workstations 110 send data to the Central Data Collector 304 while it is not able to receive it from its buffers, and the buffers become full.

Accordingly a need exists for a new data definition design that overcomes the problems in the prior art and moves away from data specific layout so that migration problems with hard coded database definitions can be minimized, and the capability to customize a base installation can be provided.

SUMMARY OF THE INVENTION

Briefly according to the present invention, a method for encapsulating the form and function of user data in a relational database that eliminates database schema changes whenever the presentation of the user data changes is disclosed. The method comprises receiving source data, associated source data definitions and report layouts consisting of report headings and report logic. The source data definitions and the report layouts are parsed into three or more user data types: (1) an organizational type fields identifying a data collection; (2) value type fields containing data values in the data collection; and (3) procedural type fields containing one or more form keywords and function keywords. After the source data is received and parsed, the method includes the steps of: creating one or more form keywords for classifying and describing the data values that can be collected and presented based upon the source data definitions and the report headings; creating one or more function keywords for identifying an arithmetic relationship for the data values in the data collection based upon the report logic; creating blank or NotApplicable form and function keywords to indicate when a form or function keyword in the procedural type field does not apply for some user data. Next, the form keywords and the function keywords are associated with the source data based upon a conversion mapping table that specifies which of the form keywords and which of the function keywords are assigned to the source data definitions so as to create user data. A user data database schema is created by assigning names and data types to each of the organizational type fields, the value type fields and the procedural type fields and the user data is stored in a relational database using the user database schema. Lastly, the user data is presented from the relational database so that standard database queries are used to present the data without the need for additional algebraic processing, whereby changes to the presentation of the user data do not require changes to the user database schema, but rather the changes to the presentation of the user data are based upon changes to one or more of the source data, the source data definitions, the conversion mapping table, the form keywords and the function keywords.

Significant savings can be achieved with a new Relational Database 116 data definition design that eliminates changing the schema to reflect new types of information. Stored reports that are redesigned to display data directly via SQL functions without compiled code special handling of data content, will not need to be changed as new types of data are added. Changes to the record format of the directory assistance utilization information data collection on the Operator Workstation 110 can then be implemented without requiring migrations to a new relational database and new stored reports. The addition of a conversion routine that converts the record collected from the Operator Station 110 into redesigned records can also eliminate the need to change the software on the Central Data Collector 304. By designing the conversion routine using a table driven approach, software changes to this routine can also be eliminated.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 9A is a prior art call statistic record (source data) to be mapped using the block diagram of FIG. 8, according to the present invention.

FIG. 9B is the conversion mapping table and the procedural type field tables containing form and function keywords used in the conversion of the call statistic record to the encapsulated call statistic records (user data), according to the present invention.

FIG. 10 is a table of the user data presented after the conversion using the tables of FIG. 9B and the source data of FIG. 9A, according to the present invention.

FIG. 11 is an exemplary output of an SQL query using the user data presented from FIG. 10 according to the present invention.

FIG. 12A is a modified prior art call statistic record (source data) with the new SearchKeystrokes entry to be mapped using the functional block diagram of FIG. 8, according to the present invention.

FIG. 12B is the conversion mapping table and the procedural type field tables containing form and function keywords with additional entries used in the conversion of the modified call statistic record in FIG. 12A to the encapsulated call statistic records (user data), according to the present invention.

FIG. 13 is a table of the user data presented after the conversion using the tables of FIG. 12B and the source data of FIG. 12A, according to the present invention.

FIG. 14 is an exemplary output of an SQL query using the user data presented from FIG. 13 according to the present invention.

DETAILED DESCRIPTION OF THE PREFERRED EMBODIMENTS

Figure 1:
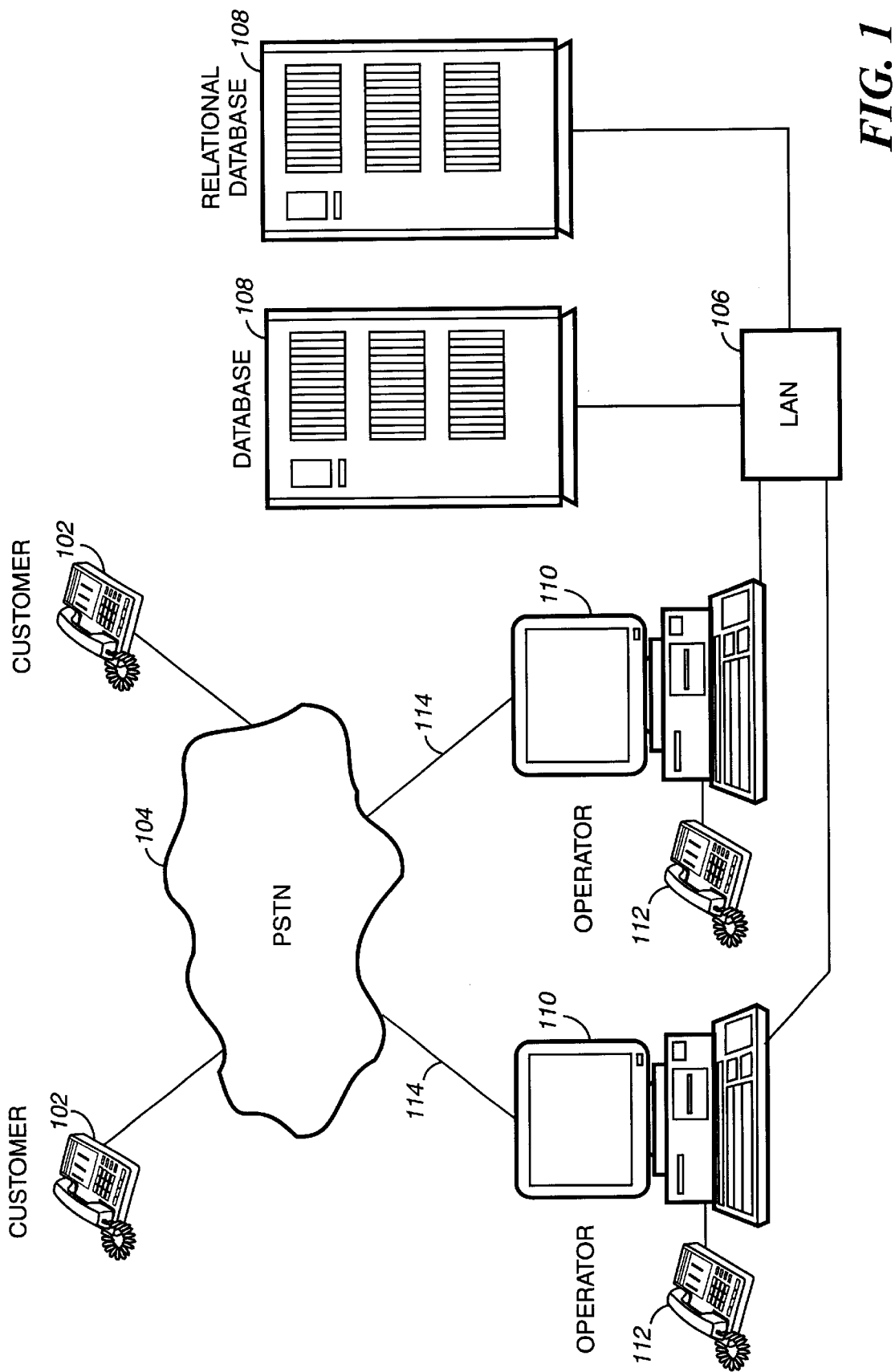
FIG. 1 is a functional block diagram of a telephone network for bulk calling using analog phone lines to a Public Switch Telephone Network (PSTN).

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Figure 2:
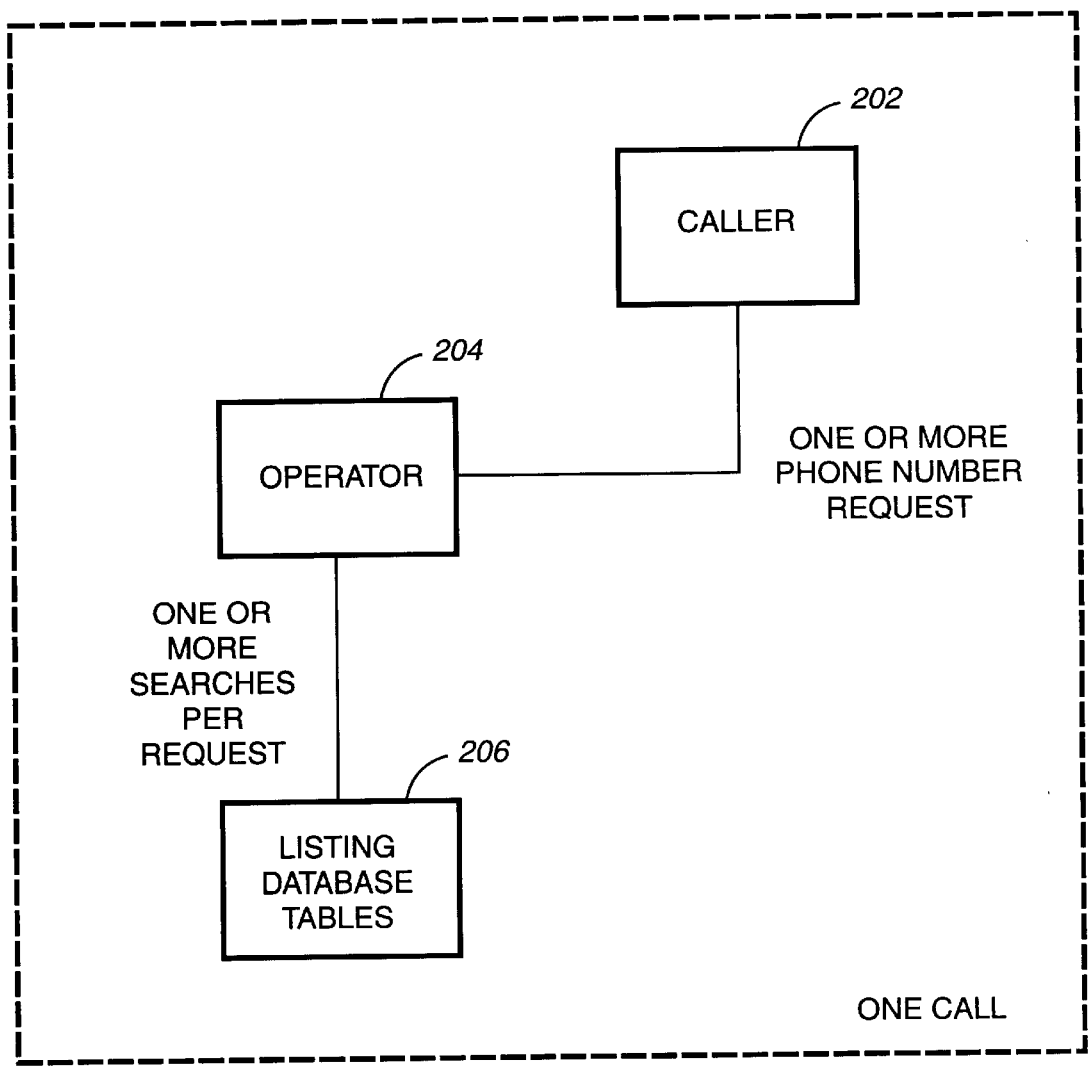
FIG. 2 is a block diagram of call interaction between a caller and an operator using the PSTN of FIG. 1.
Figure 3:
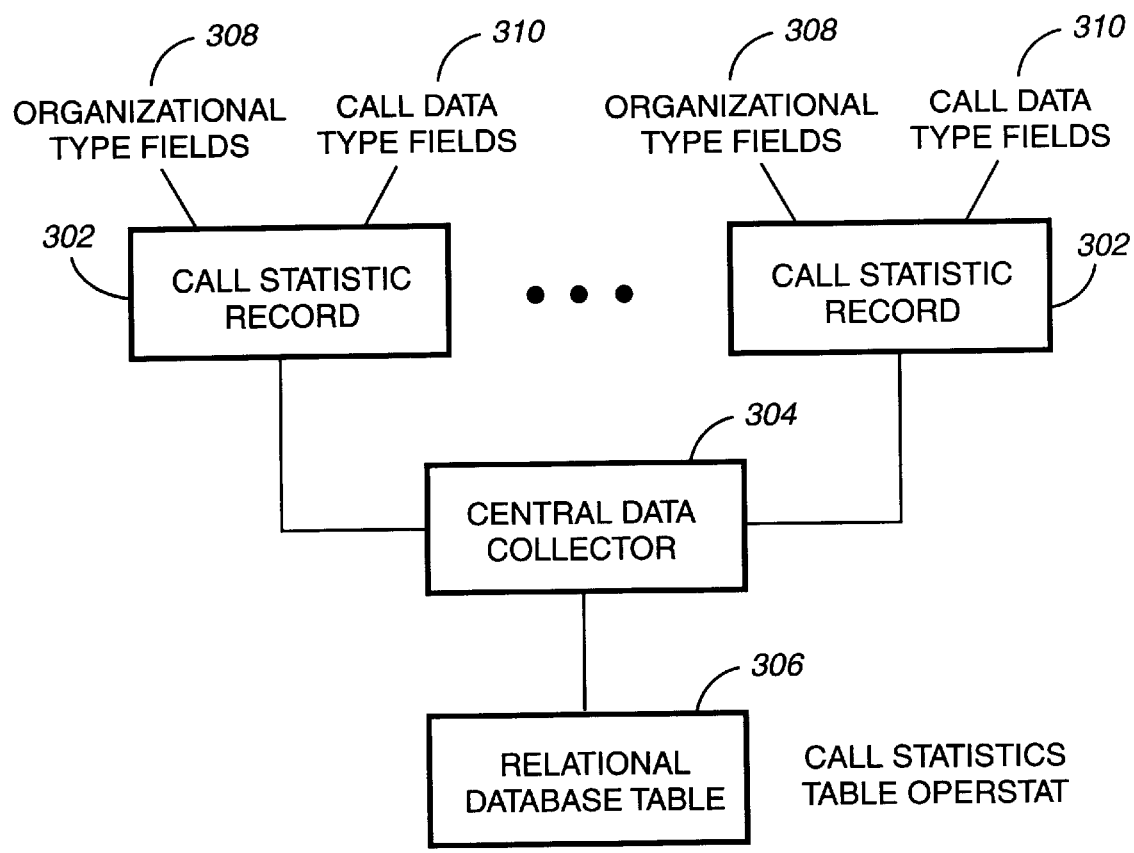
FIG. 3 is a block diagram of prior art call statics generation after each operator call using the PSTN of FIG.1.
Figure 4A:
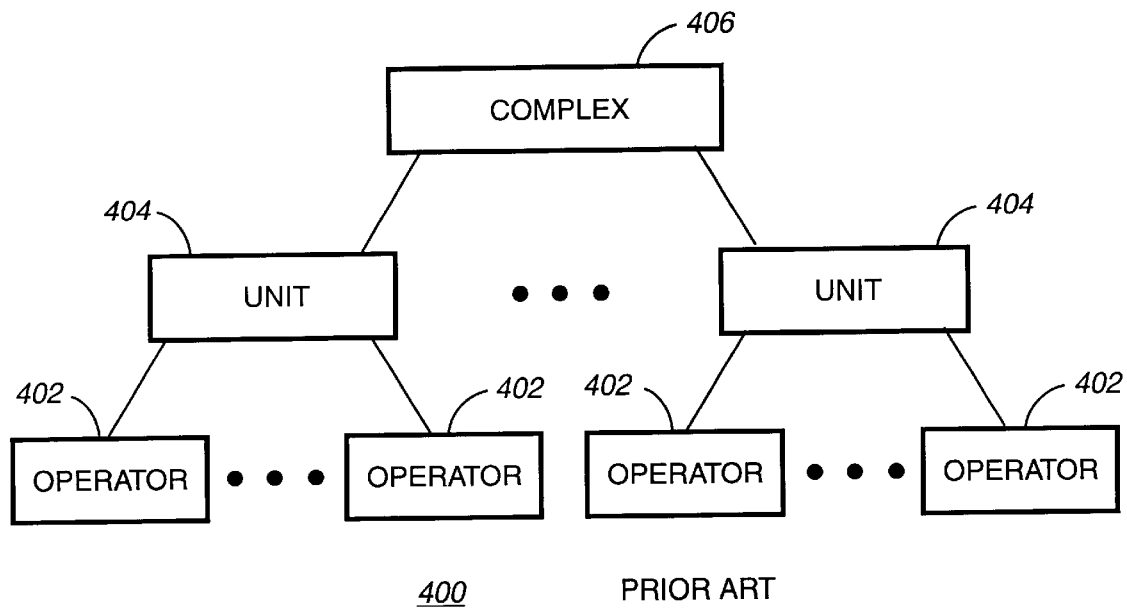
FIG. 4A is a block diagram illustrating an exemplary prior art hierarchy of business organizations within organizational type fields in call statistics generated in FIG. 3.
Figure 4B:
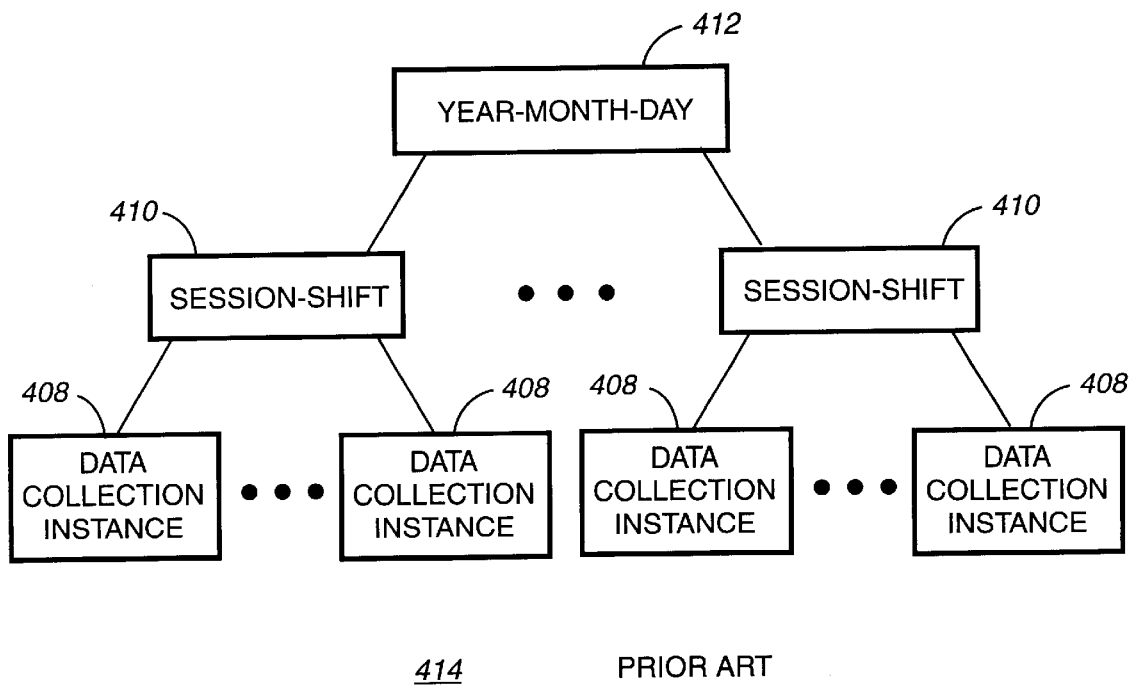
FIG. 4B is a block diagram illustrating an exemplary prior art hierarchy of time organizations within organizational type fields in call statistics generated in FIG. 3.
Figure 5A:
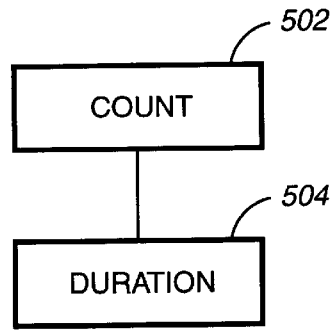
FIG. 5A is a block diagram illustrating exemplary prior art Call Data Numeric Information Type Fields within call data type fields in call statistics generated in FIG. 3.
Figure 5B:
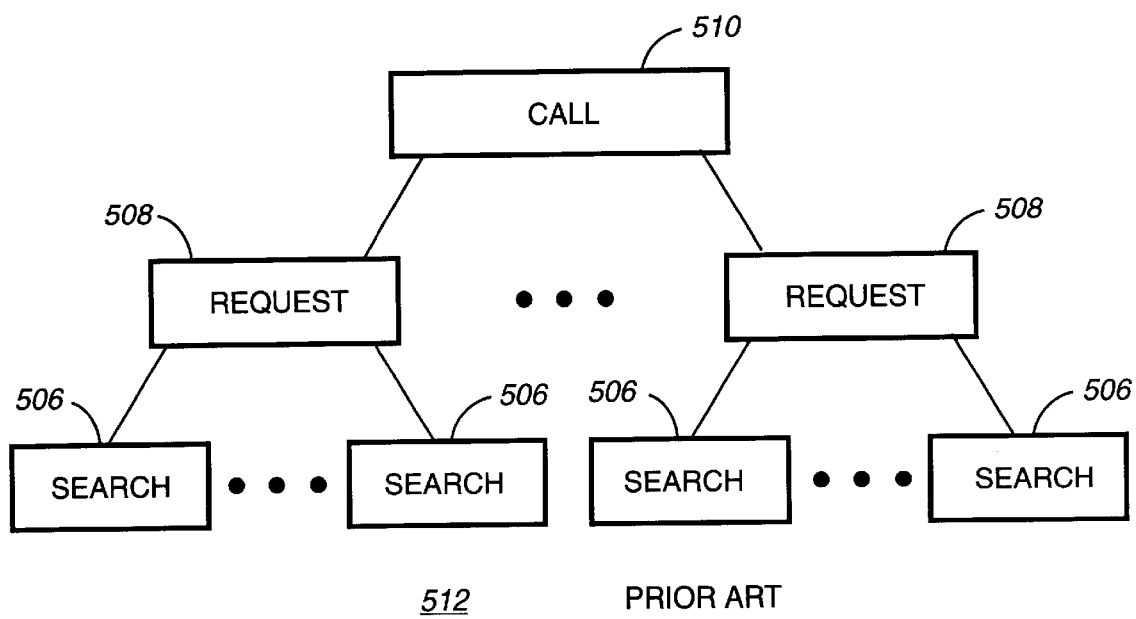
FIG. 5B is a block diagram illustrating exemplary prior art hierarchy of Call Data Activities within call data type fields in call statistics generated in FIG. 3.
Figure 7:
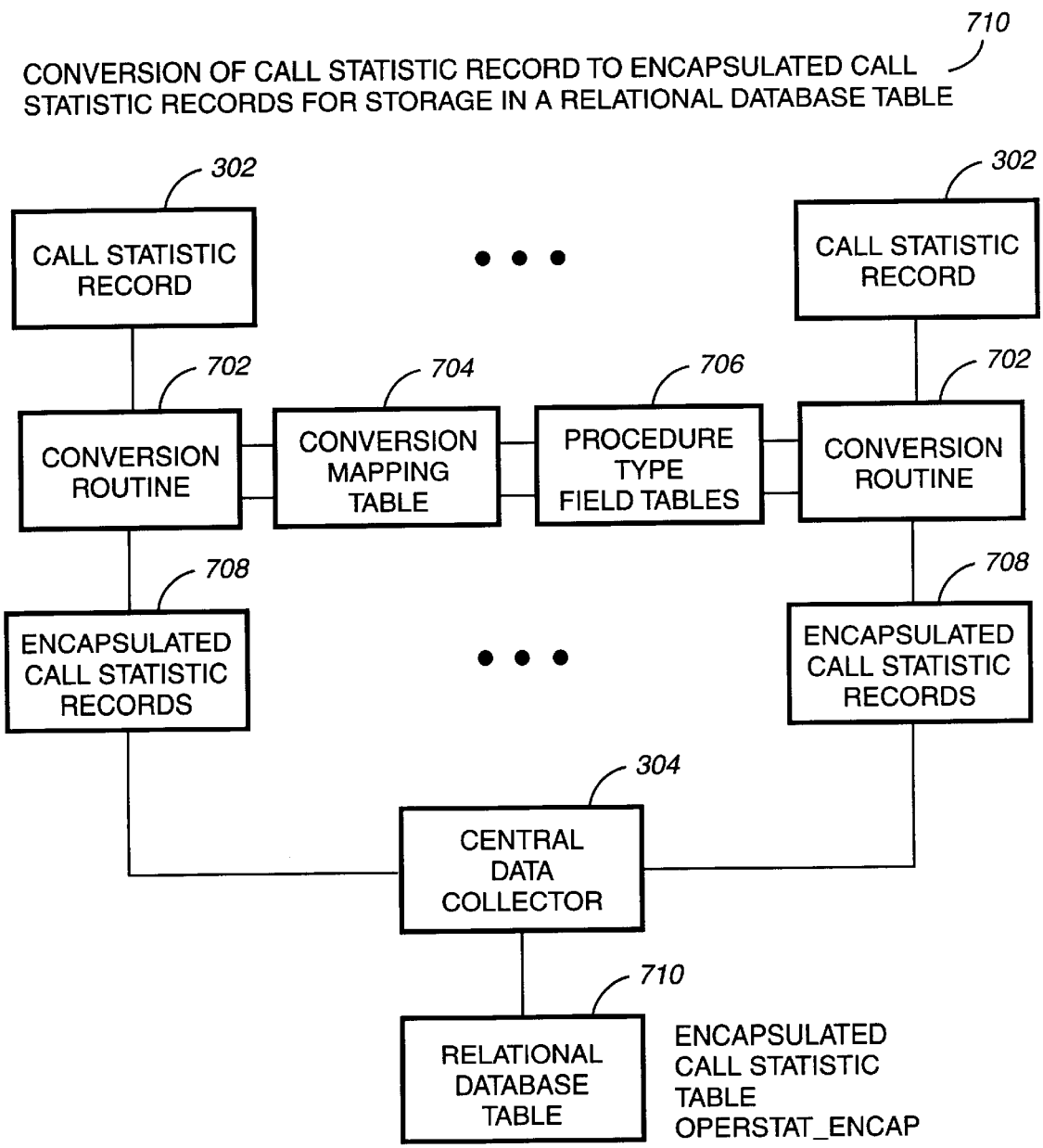
FIG. 7 is a block diagram of the conversion of a call statistic record of FIG. 6 to encapsulated call statistic records using the PSTN of FIG. 1, according to the present invention.

Overview of Conversion of Call Statistic Record to Encapsulated Call Statistic Records A block diagram 700 of the conversion of call statistic record to encapsulated call statistic records using the PSTN of FIG. 1, is illustrated in FIG. 7. As described in the prior art call statistics generation for FIG. 3 above, Call Statistics are generated after each call has terminated in FIG. 2 and are stored in a temporary repository on the operator system 110. When a data collection Instance occurs, the interim Call Statistics are gathered and summarized into a Call Statistic Record 302 which is comprised of Organizational Type Fields 308 and Call Data Type Fields 310. The Call Statistic Record 302 is then converted into Encapsulated Call Statistic Records 708, as further described in FIGS. 8–12 below using a Conversion Routine 702 along with Conversion Mapping Table 704 and Procedural Type Field Tables 706 containing Form and Function Keywords.

Afterwards, the encapsulated call statistic records 708 are sent to a Central Data Collector 304 which processes the Data Collections into a relational database table 710 in relational database 116 so that they can be archived, analyzed, and displayed.

Figure 6:
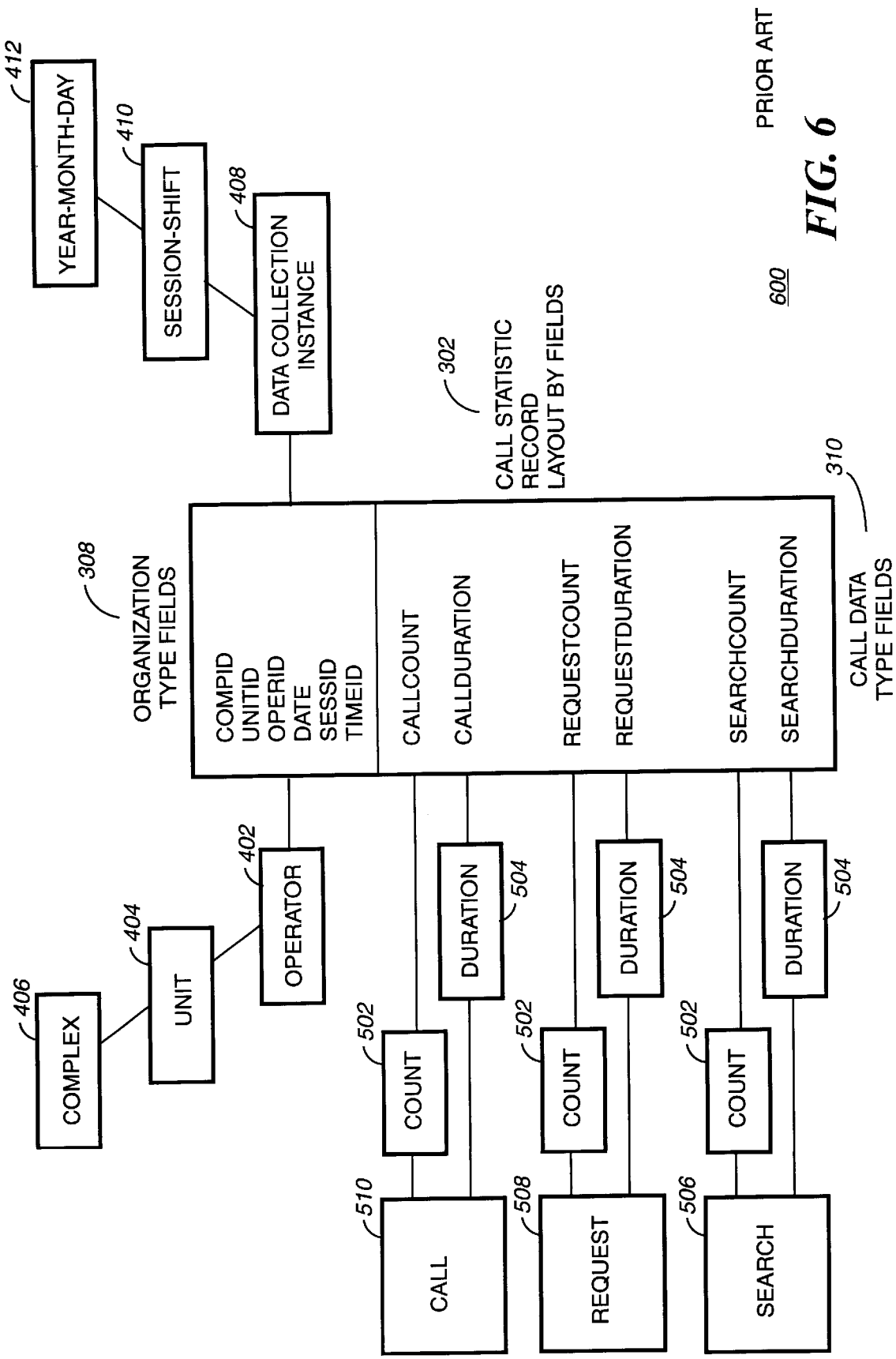
FIG. 6 is a block diagram illustrating exemplary prior art call statistic record generated at a data collection instance for an operator station 110.
Figure 8:
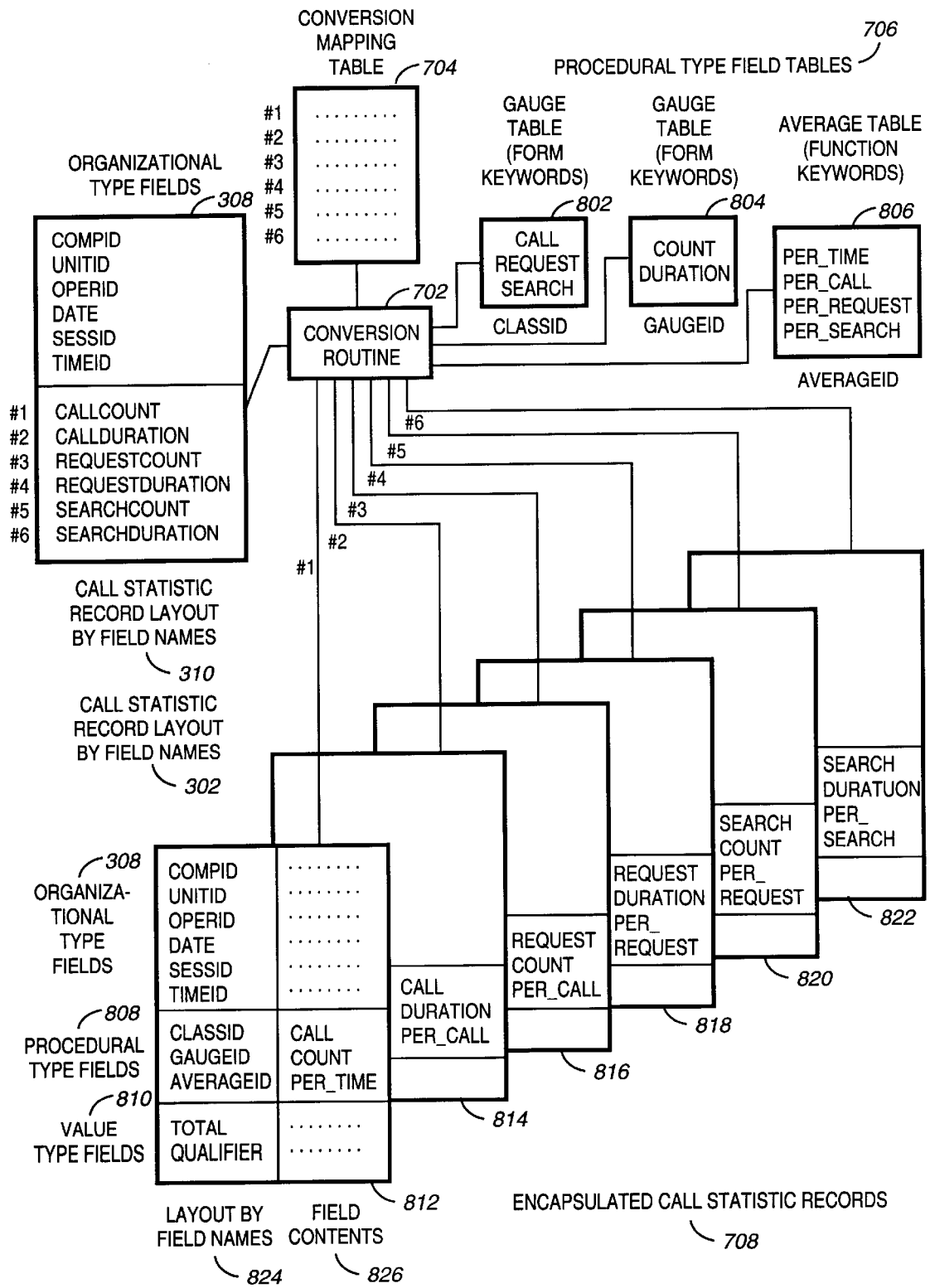
FIG. 8 is a block diagram illustrating the conversion of a call statistic record of FIG. 6 into encapsulated call statistic records using the block diagram of FIG. 7, according to the present invention.

Details of Conversion of a Call Statistic Record Into Encapsulated Call Statistic Records FIG. 8 is a block diagram 800 illustrating the conversion of a Call Statistic Record 302 of FIG. 6 into encapsulated call statistic records 708 using the block diagram of FIG. 7, according to the present invention. As described above, the Call Statistic Record 302 comprises Organization Type Fields 308 and Call Data Type Fields 310. Each Call Statistic Record 302 is converted using Conversion Routine 702 with Conversion Mapping Table 704 and Procedural Type Field Tables 706 comprising with fields ClassID of Class Table 804 containing Form keywords, GaugeID of Gauge Table 806 containing Form keywords, AverageID of Average Table 808 containing Function keywords as is described further below in FIG. 9 into one or more Encapsulated Call Statistic Records 708. Continuing further, shown here are six Encapsulated Call Statistics Records 812, 814, 816, 818, 820 and 822. It should be understood that one or more encapsulated call statistic records 708 can be created and that the six records shown here are just an example only. Each of the Encapsulated Call Statistic Records 708 have Organizational Type Fields 308, Procedural Type Fields 808 and Value Type Fields 810. The field names assigned to these fields are shown in the Layout by Field Names 824. The Procedural Type Fields 808 contents shown in Field Contents 826 are populated from the Procedural Type Field Tables 706 which classify and describe each Call Data Type Fields 310 using Form Keywords in the Class Table 804 and the Gauge Table 806 and define behavior using Function Keywords in Average Table 808 as are described in FIG. 9 below.

FIG. 9A is a prior art Call Statistic Record (Source Data) 302 with contents shown to be mapped using the block diagram of FIG. 8, according to the present invention. Using the following pseudo code in the conversion routine 702:

I. Use the Conversion Mapping Table 704 to create six output user data records with contents in output user data field positions 10–11 copied from various source record fields;

II Use the Conversion Mapping Table 704 to update six output user data records with contents in output user data field positions 7–9 copied from various entries in fields ClassID, GaugeID and AverageID from procedural type field tables Class, Gauge and Average; and II Copy source data contents in source record field positions 1–6 to all 6 output user data record field positions 1–6.

FIG. 9B is the Conversion Mapping Table 704 used in the conversion of the call statistic record 302 to the Encapsulated Call Statistic Records (user data) 708, according to the present invention. For example the table entry#1 902 for the Table Field Entry# or Source Field # 904 and for the output record field #7, #8, #9, #10, #11 906 from the conversion mapping table corresponds to:

1 1 1 7 (7/7) (7/7) means take field 7 divided by field 7 to yield a value of 1 and looking at the Encapsulated Call Statistic Record 812 in FIG. 8 for which is output record #1 in this example we have the Field Contents 826 of:

CALL
COUNT
PER_TIME which corresponds directly to the first entry positions in each of the Procedural Type Field Tables 708 of Class 802, Gauge 804, and Average 806. In addition, the last 2 entries of "7 and (7/7)" in the conversion mapping table above correspond source data 302 field #7 CallCount value of 10 into field #10 of user data 708 record #1 812 in FIG. 10. A value of 1 is inserted into field #11 of user data 708 record #1 812 for the averaging function of PER_TIME which represents 1 data collection instance.

User Data Presented

FIG. 10 is a table of the User Data 1000 presented using the conversion mapping table of FIG. 9B and the Source Data of FIG. 9A, according to the present invention. Continuing with the example above of output record #1 812, the output presented is:

1 1 1 12/31/00 1 10:00 CALL COUNT PER_TIME 10 1

Notice fields #1–#6 are identical for this User Data 1000 and that fields #7–#11 are different depending on how they are populated using the Conversion Mapping Table 704, stated differently, "CALL, COUNT, PER_TIME" of Encapsulated Call Statistic Record 812.

SQL Query of User Data Presented

FIG. 11 is an exemplary output of an SQL query using the User Data 1000 presented from FIG. 10 according to the present invention. Using standard SQL or native SQL calls which use the fields containing the Form Keywords (in tables 802 and 804) and the Function Keywords in table 806 to format the output of the data, and generating a Average using the simple arithmetic of dividing the contents of field Total by the contents of the field Quantifier from the relational database table 710 OPERSTAT_ENCAP.

Handling Modifications to Call Statistic Record

FIG. 12A is a modified prior art call statistic record (source data) with the new SearchKeystrokes field 1202 to be mapped using the functional block diagram of FIG. 8.

FIG. 12B shows the changes required to reflect the new Source Data field SEARCHKEYSTROKES in the output User Data Records. The changes are as follows:

add a 7th entry into the Conversion Mapping Table 704;

add a 3rd entry 'KEYSTROKES' into the Gauge Table 804

Additional User Data Record Created

FIG. 13 is a table of the User Data 1300 presented using the conversion mapping table of FIG. 12B and the Source Data of FIG. 12A, according to the present invention. An additional user data output record #7 1302 has been created.

SQL Query of User Data Presented Including Additional User Data Record Created

FIG. 14 is an exemplary output of an SQL query using the User Data 1300 presented from FIG. 13 according to the present invention. No changes have been made to this query as described in FIG. 11. An additional row of data is presented that reflects the information in the additional user data output record created in FIG. 13.

Flow Diagram of Conversion of Call Statistic Record

Figure 15:
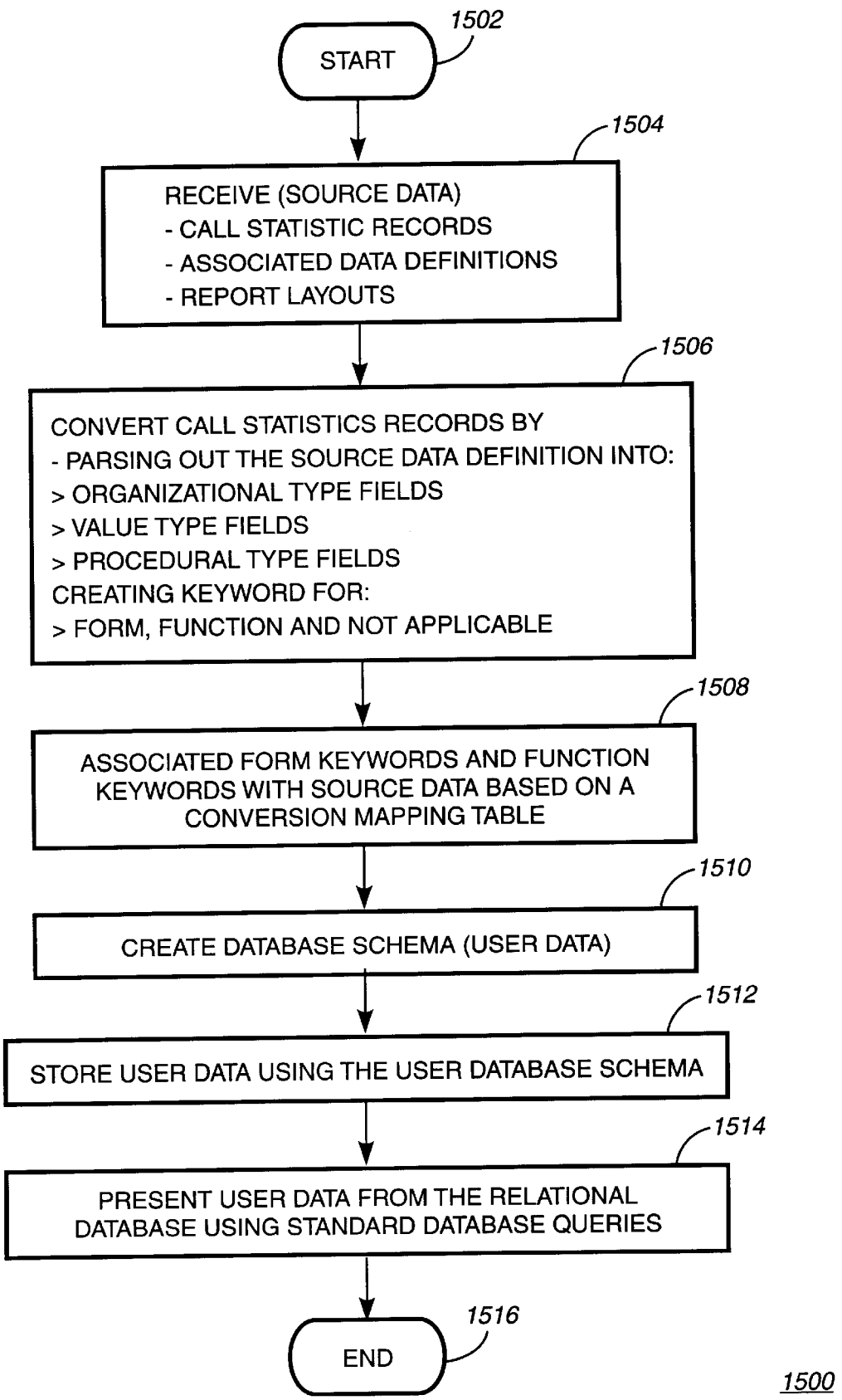
FIG. 15 is a flow diagram corresponding to the block diagram of FIG. 8 illustrating the conversion of a call statistic record of FIG. 6 into encapsulated call statistic records using the block diagram of FIG. 7, according to the present invention.

FIG. 15 is a flow diagram 1500 corresponding to the block diagram of FIG. 8 illustrating the conversion of a call statistic record of FIG. 6 into encapsulated call statistic records using the block diagram of FIG. 7, according to the present invention. The process 1500 begins with step 1502 and the source data is received in step 1504. The source data includes call statistic records 302, associated data definitions and report layouts. In step 1506, the source data is parsed into three or more user types: (1) organizational type fields 308; (2) value type fields 810; and (3) procedural type fields 808. In addition in step 1506 keywords (including the not applicable) 802 and 804 and for function 806 are created. Next in step 1508, the form keywords (802 and 804) and function keywords 806 are associated with source data based on a mapping table 704. A database schema is created for the user data in step 1510. The user data is stored using the user database schema in step 1512. The user data from the relational database is then presented and the process completes in steps 1514 and 1516.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for encapsulating the form and function of user data in a relational database in order to eliminate database schema changes whenever the presentation of the user data changes, comprising:

receiving source data, associated source data definitions and report layouts consisting of report headings and report logic;

parsing the source data definitions and the report layouts into three or more user data types comprising:
one or more organizational type fields identifying a data collection;
one or more value type fields containing data values in the data collection;
one or more procedural type fields containing one or more form keywords and function keywords;

creating one or more form keywords for classifying and describing the data values that can be collected and presented based upon the source data definitions and the report headings;

creating one or more function keywords for identifying an arithmetic relationship for the data values in the data collection based upon the report logic;

creating blank or NotApplicable form and function keywords to indicate when a form or function keyword in the procedural type field does not apply for some user data;

associating the form keywords and the function keywords with the source data based upon a conversion mapping table that specifies which of the form keywords and which of the function keywords are assigned to the source data definitions so as to create user data;

creating a user data database schema by assigning names and data types to each of the organizational type fields, the value type fields and the procedural type fields;

storing the user data in a relational database using the user database schema; and presenting the user data from the relational database so that standard database queries are used to present the data without the need for additional algebraic processing, whereby changes to the presentation of the user data do not require changes to the user database schema, but rather the changes to the presentation of the user data are based upon changes to one or more of the source data, the source data definitions, the conversion mapping table, the form keywords and the function keywords.

2. The method according to claim 1, wherein the step of creating a user data database schema by assigning names and data types to each of the organizational type fields, the value type fields and the procedural type fields includes assigning names to:

the one or more organizational types using specific database terminology for a single database application;

the one or more value types using generic database terminology for several database applications; and the one or more procedural types using generic database terminology for several database applications.

3. The method according to claim 1, wherein the step of creating a user data database schema by assigning names and data types to each of the organizational type fields, the value type fields and the procedural type fields includes assigning data types to:

the one or more organizational types using application specific formats;

the one or more value types using a numeric format with precision and scale to store a range of expected smallest and largest values for the value type fields; and the one or more procedural types using a character format having a character field length for storing a range of expected shortest and longest form keywords and function keywords.

4. The method according to claim 1, wherein the step of creating one or more form keywords for classifying and describing the data values that can be collected and presented based upon the source data definitions and the report headings includes organizing the form keywords into additional procedural types based upon:

whether each form keyword in a procedural type field is better specified as a single unique string or specified as two or more unique strings in a plurality of keywords for a plurality of procedural type fields which used in combination create a single unique string; and whether each form keyword in a procedural type field is be split into a plurality of form keywords for a plurality of procedural type fields to reflect a hierarchy so that an SQL functions including GROUP BY can be used to organize user data into subgroups.

5. The method according to claim 1, wherein the step of creating one or more function keywords for identifying an arithmetic relationship for the data values in the data collection based upon the report logic includes organizing the function keywords into additional procedural types based upon:

whether function keywords in an additional procedural type field are added to identify different arithmetic operations performed upon the user data;

whether function keywords in an additional procedural type field are added to identify multiple arithmetic operations performed upon the user data; and whether function keywords in an additional procedural type field are added to identify summarization operations groupings so that SQL functions including ROLLUP can be used to summarize user data within subgroups.

6. The method according to claim 1, further comprising the steps of:

creating a form and function keyword database schema by assigning names and data types to each of the procedural type field types wherein each of the procedural type fields are in procedural type field tables;

storing the form and function keywords for each procedural type fields in the procedural type field tables;

adding additional information including a sort sequence for the form keywords and the function keywords, and long descriptions;

using the procedural type field tables as database foreign keys when storing the user data to ensure that the form and function keywords used in the user data match the form and function keywords stored in the procedural type field tables; and using additional information in the procedural type field tables to control the presentation of the user data by joining in this information in SQL queries to control the sequence in which the output displays and its descriptive information.

7. The method according to claim 1, wherein the step of presenting the user data includes:

creating temporary tables that can be joined to the user data in SQL queries in order to redefine and extend the output presentation of the user data.

* * * * *